United States Patent [19]

Schneider et al.

[11] Patent Number: 5,145,569

[45] Date of Patent: Sep. 8, 1992

[54] PROCESS FOR DESALTING SOLVENT-CONTAINING ELECTROLYTE SOLUTIONS BY ELECTRODIALYSIS

[75] Inventors: Michael Schneider, Griesheim; Georg E. Miess, Königstein, both of Fed. Rep. of Germany

[73] Assignee: Hoechst Aktiengesellschaft, Fed. Rep. of Germany

[21] Appl. No.: 472,762

[22] Filed: Jan. 31, 1990

[30] Foreign Application Priority Data

Feb. 2, 1989 [DE] Fed. Rep. of Germany ....... 3903024

[51] Int. Cl.$^5$ ............................................. B01D 61/00
[52] U.S. Cl. ............................. 204/182.4; 204/182.3; 204/301
[58] Field of Search .................... 204/182.4, 182.3, 301

[56] References Cited

U.S. PATENT DOCUMENTS

| | | | |
|---|---|---|---|
| 4,504,373 | 3/1985 | Mani et al. | 204/182.4 |
| 4,636,288 | 1/1987 | Vaughan | 204/182.4 |
| 4,684,453 | 8/1987 | Vaughan | 204/182.4 |
| 4,802,965 | 2/1989 | Puetter et al. | 204/182.4 |
| 4,859,575 | 8/1989 | Kurematsu et al. | 204/182.4 |

*Primary Examiner*—John Niebling
*Assistant Examiner*—Arun S. Phasge
*Attorney, Agent, or Firm*—Connolly & Hutz

[57] ABSTRACT

A process for desalting mixtures of water and water-soluble highly active organic solvents, which contain metal salts, which comprises subjecting the mixtures to electrodialysis employing commercially available ion exchanger membranes. The electrodes are preferably washed with an electrolyte solution which is free of sulfate ions.

13 Claims, 1 Drawing Sheet

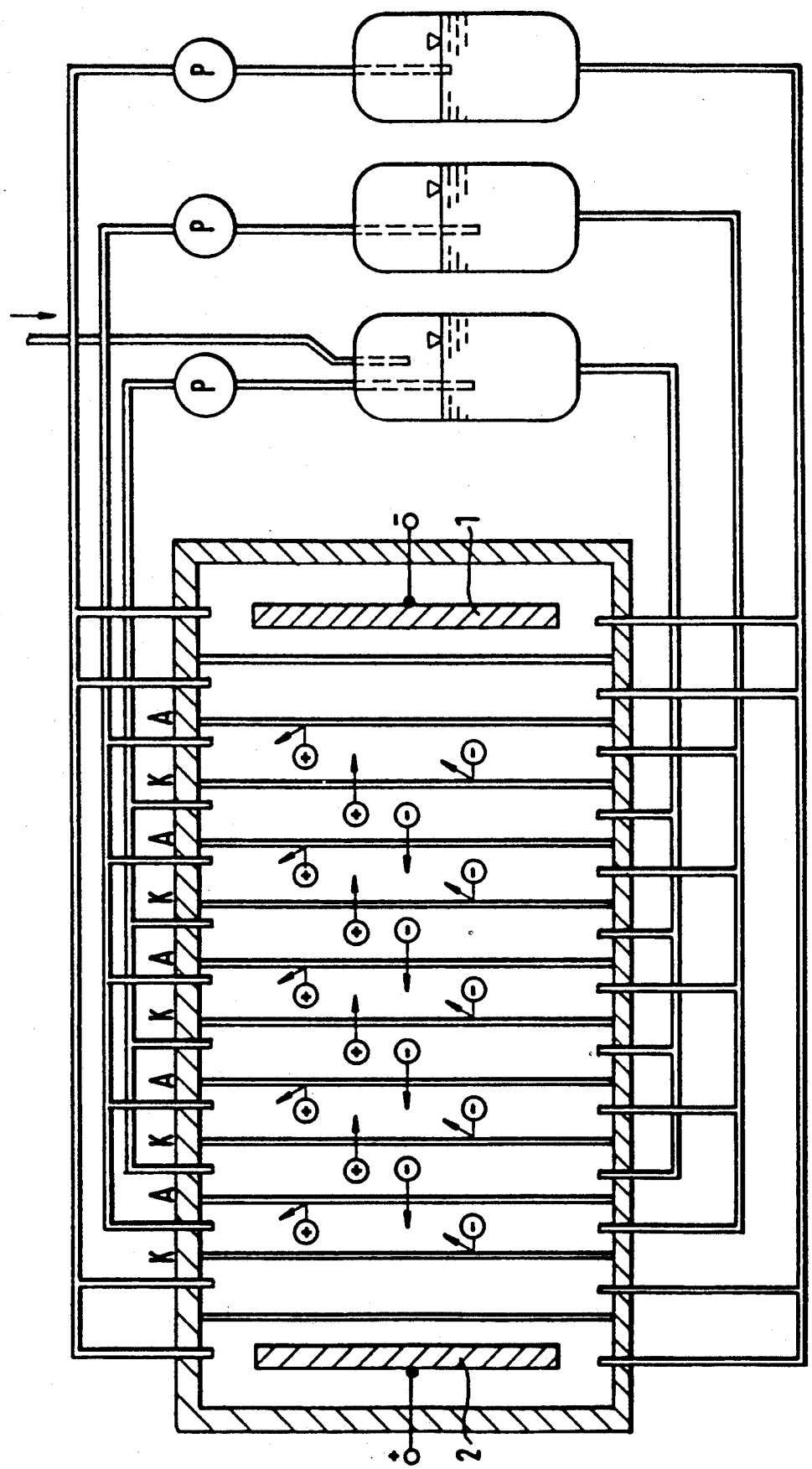

PROCESS FOR DESALTING SOLVENT-CONTAINING ELECTROLYTE SOLUTIONS BY ELECTRODIALYSIS

DESCRIPTION

The present invention relates to a process for desalting solvent-containing electrolyte solutions, i.e. mixtures of water and water-soluble, highly active organic solvents, which contain metal salts, by electrodialysis. The process is particularly suitable for desalting coagulating spin baths which are produced in the manufacture of synthetic fibers by the wet-spinning process.

Many industrial processes result in mixtures of water with highly active organic solvents which additionally contain dissolved metal salts. In order to recover the organic solvents, which is necessary for economic and ecological reasons, it is necessary to work up mixtures of this type, i.e. break them down into their constituents. As a rule, this working up includes a distillation, in which either the water or else the organic solvent is initially removed by distillation, leaving behind a distillation residue which contains the dissolved salts. A process which is widely used in industry and which results in solvent-containing electrolyte solutions of this type is the manufacture of aliphatic/aromatic polyamide and polyimide fibers. The result of this is, depending on the solvent used for the polymer, coagulating spin baths which may contain tetramethylurea, dimethylacetamide or N-methylpyrrolidone in high concentrations of up to 80%. Furthermore, as a rule, the coagulating spin baths contain the products of neutralization sodium acetate, sodium chloride, lithium chloride or calcium chloride, depending on the base used, in concentrations of up to about 5%.

Processes which have been described for removing and recovering the solvent are, for example for N-methylpyrrolidone, distillation (cf. for example Hungarian Patent No. 29,667), possibly with additional inert gas stripping to drive out the water (cf. U.S. Pat. No. 4,057,491), pure inert gas stripping (cf. German Offenlegungsschrift No. 2,709,679) and extraction processes (cf. for example Japanese Patent No. 49/48432 or U.S. Pat. No. 4,316,846). Preferably used when the water contents are low are distillation and stripping processes, and when they are higher are extraction processes.

Whereas it is possible by extraction to reduce the N-methylpyrrolidone concentration in the aqueous phase to <0.1%, when the water is removed by distillation the bottom produce from the distillation contains N-methylpyrrolidone and salts and still needs to have the solvent subsequently driven out. A high temperature (the boiling point of N-methylpyrrolidone is 200° C.) is necessary to drive these solvent residues out of the salt-containing bottom product, and is associated with partial decomposition of this solvent, or reduced pressure must be employed.

The existing electrodialysis process for desalting aqueous solutions is one with which it is possible specifically to remove ionic constituents from aqueous mixtures. The apparatus employed in electrodialysis has a positive (anode) and a negative (cathode) large-area electrode. The space between the electrodes is divided by a plurality of alternately arranged cation and anion exchanger membranes in a plurality of narrow chambers which are separated from one another by the membranes. The totality of the membranes, of the frames and sealing elements belonging thereto, and of the inlet and outlet lines, is also called the stack. Chambers which have on the cathode side an anion exchanger membrane and on the anode side a cation exchanger membrane represent the so-called concentrate chambers. Chambers which have on the anode side the anion exchanger membrane and on the cathode side the cation exchanger membrane form the so-called diluate chambers. The diluate chambers are initially filled with the crude solution to be desalted, the concentrate chambers are charged with an aqueous electrolyte, and the chambers where the electrodes are located and, where appropriate, also the neighboring chambers immediately adjacent to the latter are charged with an electrode washing solution which, in conventional processes, is usually composed of sodium sulfate solution. Under the influence of the voltage applied to the electrodes, the ions migrate out of the diluate chamber, through the membrane which is permeable for them, into the concentrate chamber. Further migration is impossible owing to the subsequent membrane, which is impermeable for the relevant type of ions, and the ion remains in the concentrate chamber. The liquids in the diluate, concentrate and electrode chambers are pumped in separate circulations, where appropriate interpolating reservoirs.

The figure shows diagrammatically one example of the design of an electrodialysis device with the electrodes cathode (1) and anode (2), the cation exchanger membranes (K), the anion exchanger membranes (A) and the electrodialysis chambers (3) formed between the membranes. Arrows which extend through a membrane indicate that the ion attached to the arrow passes through the membrane, while bent arrows show that the relevant ion is unable to pass through the membrane. The figure additionally shows the inlets for crude solution, the circulations of diluate, concentrate and the electrode washing solution with the pumps P and the relevant reservoirs (4).

After the electrodialysis has started, the solutions in the concentrate chambers and the diluate chambers are circulated separately until the desired reduction in the electrolyte content in the diluate chambers has occurred. The flow of current associated with the ion transport leads to electrolysis reactions at the electrodes. Undesired reactions can be avoided by an independent third circulation with a suitable electrode washing solution, and only water is electrolyzed.

This electrodialysis process has been used on a large scale for a long time, especially in Japan, for desalting brackish water and seawater (Japanese Patent No. 70 79 992). However, salts can be removed by electrodialysis from other solutions too, such as, for example, sugar syrup or galvanizing baths, (British Patent No. 71 11 211). It is common to all the processes hitherto disclosed that only aqueous solutions, i.e. solutions free of aggressive organic solvents, have been desalted.

The electrodialysis process has been improved in recent years by various improvements in cell design and, in particular, by the development of reversal operation of electrodialysis (periodic reversal of poles and current). A comprehensive compilation of relevant patents and published patent applications for the period from 1972 to 1985 has been prepared by the Science Relation Service (SRS) as Project 076 with the completion date of October 1985.

The many relevant publications contain no indications that it is also possible to desalt those solutions which contain high concentrations of highly active organic solvents, for example the abovementioned solvents used in the manufacture of synthetic fibers. These solvents have a very high dissolving capacity for organic polymers, even for those which are extremely poorly soluble, such as, for example, for completely aromatic polyamides, and it was therefore to be expected that the ion exchanger membranes which are customarily employed for electrodialysis and are based on organic polymeric substances would be attacked by these highly active solvents.

It has now been found, surprisingly, that the conventional ion exchanger membranes can also be employed in the presence of high concentrations of these highly active polymer solvents.

However, it has emerged that when the desalting of, for example, spin baths which contain about 10 to 80% of the solvents, for example tetramethylurea, dimethylacetamide or N-methylpyrrolidone and 0.1 to 5% metal salts, in particular calcium salts, is carried out normally, the dialysis comes to a stop after only a relatively short time. This has to be regarded as a serious limitation on the possible uses of this process, because it is exactly the most important polymer substances which are spun out of solutions which contain considerable amounts of these salts, and which are therefore subsequently found again in the coagulating spin baths.

It has now been found, furthermore, that this disadvantage of the electrodialysis process can be overcome when aqueous electrolyte solutions which are free of sulfate ions are employed as electrode washing agents.

Hence the present invention relates to a process for desalting mixtures of water and water-soluble, highly active organic solvents, which contain metal salts, by electrodialysis using customary ion exchanger membranes based on organic polymers, where, in a preferred embodiment, the electrodes are washed with an aqueous electrolyte solution which is free of sulfate ions.

The process is suitable for desalting mixtures of water and organic solvents which contain up to 80% by weight of the solvent and up to 10% by weight of water-soluble metal salts. The process is therefore particularly well suited for desalting coagulating spin baths as a preparation for the working up thereof by distillation.

In a preferred embodiment of the process according to the invention, a solution of an alkali metal salt of a lower organic carboxylic acid is employed as electrode washing solution. Particularly suitable alkali metal salts of lower carboxylic acid are alkali metal salts of saturated, aliphatic monocarboxylic acids with 1 to 8, preferably 1 to 3, carbon atoms, in particular with 1 to 2 carbon atoms. Preferred alkali metal salts are the sodium and potassium salts. In a particularly preferred embodiment of the process according to the invention, sodium acetate solution is employed as electrode washing solution.

The electrolyte concentration in the electrode washing solution is as a rule 0.1 to 1 normal, i.e. the solutions contain 0.1 to 1 g-equivalent of the electrolyte per liter.

The process according to the invention is carried out at 10 to 40° C., preferably at 20 to 30° C. The current density is set at between 1 and 200 A/m$^2$, preferably between 50 and 150 A/m$^2$, during it.

Commercially available ion exchanger membranes are employed for the process according to the invention. These membranes are composed of organic polymers which have ionic side-chains. Cation exchanger membranes contain sulfo or carboxy groups in the polymer matrix, while anion exchanger membranes have tertiary or quaternary amino groups as substituents of the basic polymeric material. Particularly suitable as basic polymeric material for the ion exchanger membranes are copolymers of styrene and divinylbenzene. Ion exchanger membranes with a capacity of 0.8 to 3, preferably 1.2 to 3.2, milliequivalent per g are preferably employed.

It is furthermore preferred for the concentrate chambers also to be filled with an electrolyte solution which is free of sulfate ions and advantageously complied with the specifications indicated above for the electrode washing solution.

It is possible with the process according to the invention to desalt solvent-containing aqueous electrolytes which contain up to 80% by weight, as a rule 10 to 60% by weight, of the organic solvent. As a rule, solutions produced in industry and containing between 20 to 40% by weight of the organic solvent are desalted. The organic solvents contained in these solutions can also be highly active polymer solvents such as, for example, tetramethylurea, dimethylacetamide or N-methylpyrrolidone. The process is also suitable for removing chlorides, fluorides, bromides or acetates of the alkali metals and alkaline earth metals.

The following exemplary embodiments illustrate the procedure for the process according to the invention.

EXAMPLE 1

An aqueous coagulating spin bath containing 40% by weight N-methylpyrrolidone and 0.8% by weight $CaCl_2$ was electrodialyzed at a voltage of 12V in a laboratory electrodialysis apparatus of the Berghof BEL 2 type with a membrane area of 296 cm$^2$.

A 4% by weight sodium acetate solution was employed as electrode washing liquid. The initial current density in this case was 120 A/m$^2$. The dialysis process was continued until the residual calcium chloride content had fallen to 0.01% by weight.

The resulting desalting capacity was 70 g of $CaCl_2$ per m$^2$ membrane area and hour; the electrical energy required was 1.8 kWh per kg of calcium chloride removed.

EXAMPLE 2

An aqueous coagulating spin bath containing 32% by weight N-methylpyrrolidone and 0.55% by weight $CaCl_2$ was electrodialyzed with a voltage of 12V in the apparatus employed in Example 1 and using the membranes already used in that case. A 2% by weight sodium acetate solution was employed as electrode washing liquid. The initial current density in this case was 100 A/m$^2$. The dialysis process was continued until the residual $CaCl_2$ content had fallen to 0.005% by weight.

The NMP loss into the concentrate was 0.5%. The resulting desalting capacity was 20 g of $CaCl_2$/m$^2$ and h; the electrical energy required was 2.35 kWh per kg of $CaCl_2$.

EXAMPLE 3

A long-term test in which the operation described in Example 2 was continually repeated revealed a reduction in capacity merely caused by slight membrane fouling after 200 hours of operation. It was possible completely to restore the capacity of the membranes by regeneration with 1% strength hydrochloric acid.

EXAMPLE 4

An aqueous coagulating spin bath containing 26% by weight N-methylpyrrolidone and 0.5% by weight $CaCl_2$ was electrodialyzed at a voltage of 12V employing the apparatus employed in Example 2 with a total membrane area of 296 cm². A 2% by weight sodium acetate solution was employed as electrode washing liquid. The initial current density was 90 A/m². The dialysis process was continued until the residual $CaCl_2$ content had fallen to 0.002% by weight.

The NMP yield in the diluate was 99.6%, the resulting desalting capacity was 18 g of $CaCl_2$/m² of membrane area and hour, and the electrical energy required was 1.8 kWh/kg of $CaCl_2$.

It is also possible in the same way as described in Examples 1 to 4 to desalt coagulating spin baths with, in place of N-methylpyrrolidone, other highly active polymer solvents such as, for example, dimethylformamide, dimethylacetamide, hexamethylphosphoric triamide or tetramethylurea. The desalting capacities achieved in these cases are approximately the same as in the above examples. The desalted solutions obtained after the electrodialysis can be directly passed to working up by distillation.

COMPARISON TEST

An aqueous coagulating spin bath containing 27% by weight N-methylpyrrolidone and 0.55% by weight calcium chloride was electrodialyzed at a voltage of 12V in a laboratory electrodialysis apparatus of the Berghof BEL 2 type with a membrane area of 296 cm² in analogy to Example 1.

A 4% by weight sodium sulfate solution was employed as electrode washing liquid.

The flow of current decreased greatly after a few hours, and ion transport was observed to have ceased. The test had to be discontinued and the stack of membranes disassembled. It emerged from this that a solid salt encrustation had formed on the electrode side of the outer ion exchanger membranes in each case.

We claim:

1. A process for desalting mixtures of water and water-soluble highly active organic solvents, which contain metal salts, which comprises subjecting mixtures of water and 20% to 80% by weight water-soluble highly active organic solvents selected from the group consisting of tetramethylurea, dimethylacetamide and N-methylpyrrolidone to electrodialysis employing commercially available ion exchanger membranes.

2. The process as claimed in claim 1, wherein the electrodes are washed with an electrolyte solution which is free of sulfate ions.

3. The process as claimed in claim 1, wherein ion exchanger membranes based on copolymers of styrene and divinylbenzene are employed.

4. The process as claimed in claim 1, wherein ion exchanger membranes with a capacity of 0.8 to 3, preferably 1.2 to 2.2, milliequivalent per g are employed.

5. The process as claimed in claim 1, wherein the process is carried out at 10 to 40° C.

6. The process as claimed in claim 1, wherein a current density of 1 to 200 A/m² is used.

7. The process as claimed in claim 1, including using an electrode washing solution comprising an aqueous solution of an alkali metal salt of a lower organic carboxylic acid.

8. The process as claimed in claim 1, including using an electrode washing solution comprising an aqueous sodium acetate solution.

9. The use of the process of claim 1 for desalting mixtures of water and organic solvents which contain up to 80% by weight solvent and up to 10% by weight metal salts.

10. The use of the process of claim 1 for desalting coagulating spin baths.

11. A process for desalting mixtures of water and water-soluble highly active organic solvents, which contain metal salts, which comprises subjecting mixtures of water and 20% to 80% by weight water-soluble highly active organic solvents used in the manufacture of aliphatic or aromatic polyamide fibers and polyimide fibers to electrodialysis employing commercially available ion exchanger membranes, and wherein the electrodes are washed with an electrolyte solution which is free of sulfate ions.

12. A process for desalting mixtures of water and water-soluble highly active organic solvents, which contain metal salts, which comprises subjecting mixtures of water and 20% to 80% by weight water-soluble highly active organic solvents used in the manufacture of aliphatic or aromatic polyamide fibers and polyimide fibers to electrodialysis employing commercially available ion exchanger membranes, and using an electrode washing solution comprising an aqueous solution of an alkali metal salt of a lower organic carboxylic acid.

13. A process for desalting mixtures of water and water-soluble highly active organic solvents, which contain metal salts, which comprises subjecting mixtures of water and 20% to 80% by weight water-soluble highly active organic solvents used in the manufacture of aliphatic or aromatic polyamide fibers and polyimide fibers to electrodialysis employing commercially available ion exchanger membranes, and using an electrode washing solution comprising an aqueous sodium acetate solution.

* * * * *

UNITED STATES PATENT AND TRADEMARK OFFICE
CERTIFICATE OF CORRECTION

PATENT NO. : 5,145,569
DATED : September 8, 1992
INVENTOR(S) : SCHNEIDER ET AL

It is certified that error appears in the above-identified patent and that said Letters Patent is hereby corrected as shown below:

Column 1, line 50, "produce" shoudl read -- product --.

Column 1, line 53, "200°" should read -- 202° --.

Signed and Sealed this

Seventh Day of September, 1993

Attest:

BRUCE LEHMAN

Attesting Officer     Commissioner of Patents and Trademarks